3,163,631
PROCESS FOR THE PRODUCTION OF HALOGENATED OLEFIN POLYMERS AND COPOLYMERS
Jacques Schwander and Jean Fouré, Brussels, Belgium, assignors to Solvay & Cie, Brussels, Belgium, a Belgian company
No Drawing. Filed Jan. 24, 1961, Ser. No. 84,508
Claims priority, application Netherlands, Feb. 12, 1960, 248,355
5 Claims. (Cl. 260—94.9)

The present invention relates to a process for the production of halogenated olefin polymers and copolymers by the action of a halogen on the solid polymer or copolymer, in a finely divided state, so that the process yields pliable and stable halogenated olefin polymers and copolymers of uniform structure.

It is known that the process employed for the production of a halogenated polyolefin decides the properties of the polymer since it determines the distribution of the halogen atoms along the macromolecular chain (Trans. Faraday Soc., 1946, 42 A, pages 197–205).

In fact, the structure of a polyolefin, particularly of polyethylene, consists of crystalline zones known as crystallites and of amorphous zones; such crystallites can only be halogenated with difficulty whilst the amorphous zones do so rapidly (Trans. Faraday Soc., 1945, 41, April-May, pages 246–260; Trans. Faraday Soc., 1946, 42 A, pages 197–205).

The various processes known for the production of halogenated olefin polymers and copolymers relate chiefly to the chlorination of polyethylenes.

A process which is currently in use consists of the preparation of a solution of polyethylene in an organic solvent, such as carbon tetrachloride; dissolution takes place at atmospheric pressure when use is made of polymers obtained by the polymerisation of ethylene at high pressures and in presence of oxygenated catalysts (British Patent 481,515), or at pressures in excess of atmospheric pressure when use is made of polyethylenes obtained by polymerisation at relatively low pressure and in presence or organometallic catalysts (French Patent 1,134,094). Thereafter, the dissolved polymer is subjected to chlorination at temperatures of the order of 60° C. in the case of polymers obtained at high pressure, and at temperatures above the boiling point of the solvent in the case of polymers obtained at low pressure. Whilst the polymer is in the dissolved state, the crystallites no longer exist, and chlorination takes place with uniform distribution of the chlorine atoms along the macramolecular chain.

Above a certain chlorine content (of the order of 40% by weight, on the total matter), chlorine plays the part of a hardening agent. As a consequence of this phenomenon, the products obtained having a chlorine content at less than 40% by weight, on the total matter, are rubbery, soft, generally sticky and require subsequent vulcanisation for quite a large number of applications. On the other hand, the chlorinated products having a chlorine content of more than 40% by weight, up to 55% or more, are rigid and brittle, and therefore practically unusable.

Owing to their practically uniform structure, the chlorinated polyethylenes obtained by the above stated processes are relatively stable towards heat and light.

It is also known how to effect chlorination at a low temperature (less than 100° C.) in aqueous suspension (United States Patent 2,592,763) or in suspension in an organic diluent (Belgian Patent 548,099). In that case, the temperatures are too low to cause break-up of the crystalline zones in the polymer structure. As a consequence, only the amorphous zones are chlorinated. The concentration of chlorine atoms in these zones therefore causes hardening of the polymer, and thus rigid but brittle products are obtained which can only be utilised with difficulty.

It is also know how to carry out chlorination at 40–90° C. on solid, finely divided polyethylenes in suspension in a gaseous medium, particularly in the chlorine used for the operation (Belgian Patent 539,466). The statements expressed for the chlorination in suspension in water or in an organic solvent are equally valid for this last process.

Moreover, polyethylenes which are chlorinated in suspension are less stable towards heat and light, and quickly turn yellow.

The applicants have discovered that it is possible to prepare halogenated olefin polymers and copolymers which do not exhibit the various above stated disadvantages, i.e. pliant and stable halogenated olefin polymers and copolymers of uniform structure, by halogenation of the solid olefin polymer or copolymer in a finely divided state at an elevated temperature in presence of an antistatic agent.

The object of the present invention is a process for the production of halogenated olefin polymers and copolymers by the action of a halogen on the solid olefin polymer or copolymer in a finely divided state, characterised in that the operation is carried out with the aid of gaseous halogen, optionally diluted with an inert gas, in presence of an antistatic agent at a temperature above the temperature at the onset of the phenomenon of endothermal fusion characteristic for the treated olefin polymer or copolymer.

"Olefin polymer or copolymer" denotes any polymer of ethylene and its homologues, for example propylene, butene, isobutene, pentene, hexene, as well as copolymers of such olefins, regardless of the known polymerisation processes by which such polymers and copolymers are obtained.

The halogenation process which constitutes the object of the invention is particularly applicable to the chlorination of polyethylenes, ethylene-propylene copolymers, and ethylene-butene copolymers obtained by the known polymerisation process which takes place at low pressures and with catalysts based on metallic and/or organometallic compounds.

The temperature at which the halogenation process, as specified by the applicants, is effected, is defined in relation to a specific temperature for each olefin polymer or copolymer, this temperature being determined by differential thermal analysis. This latter technique consists of subjecting to the same regular rise in temperature, firstly a thermally inert material serving as reference medium, and secondly the material under investigation which is liable to undergo physical or chemical changes accompanied by evolution or absorption of heat. The physico-chemical phenomena which are produced in the material under investigation are revealed by the curve representing the temperature differences which exist, at any instant, between this material and the reference material.

In particular, the determined thermal differential analysis curve characteristic for an olefin polymer or copolymer clearly indicates an endothermal phenomenon characterised by two specific points. This endothermal effect corresponds to the fusion of the crystallites in the polymer or copolymer, i.e. to the softening of the material. The two specific points correspond to the two temperatures which indicate the onset and the end, respectively, of the softening of the material. These two temperatures are known as the temperature at the onset and the temperature at the end of the endothermal fusion phenomenon.

In the process which constitutes the object of the invention, the operating temperature is higher than the temperature at the onset of the endothermal fusion phenomenon characteristic for the treated olefin polymer and copolymer. It can be selected, for instance, as intermediate between the temperature at the onset and the temperature at the end of the endothermal fusion phenomenon. Lighting the reaction medium is often an advantage.

The temperature employed reduces the rigidity of the crystallites in the starting polymer or copolymer, and facilitates halogenation. As a consequence, the halogen atoms are uniformly distributed along the macromolecular chain.

Nevertheless, when such conditions are employed by themselves, the product degrades rapidly during halogenation, and chars.

The applicants have observed with surprise that this latter disadvantage can be prevented when halogenation is carried out on the olefin polymer or copolymer with which an antistatic agent has been incorporated, generally in the proportion of 0.5–5% by weight, on the polymer.

During halogenation, the polymer or copolymer often adheres to the walls of the reaction vessel in the form of a very crumbly and readily detachable cake.

The halogenated olefin polymer or copolymer obtained at the end of the operation is a white stable solid which remains stable when it is subjected to the action of heat and/or light.

Quaternary ammonium salts constitute a class of particularly effective antistatic agents when employed in the process which is the object of the invention. Among salts, reference may be made, for instance, to triethanolaminelauryl sulphate, stearamidopropyl-dimethyl-$\beta$-hydroxyethyl-ammonium dihydrogen phosphate, dodecyl-trimethyl-ammonium chloride, octadecyl-trimethyl-ammonium chloride, and dimethyl-benzyl-lauryl-ammonium chloride.

Halogenation of the solid olefin polymer or copolymer can be achieved in a finely divided state and in a single stage at the above-defined temperatures and in presence of the anti-static agent, or preferably by means of two stages: a partial halogenation at a temperature below the temperature at the onset of the endothermal fusion phenomenon characteristic for the treated polymer or copolymer, in presence or, better, in absence of the anti-static agent, followed by intensive halogenation at a temperature such as is defined above, in presence of the antistatic agent.

Practical examples of effecting the process consist in carrying out halogenation of a suspension of the solid olefin polymer or copolymer, in a finely divided state, in the gaseous halogen, optionally diluted by means of an inert gas, or alternatively of a bed of the solid polymer, in a finely divided state, fluidised by means of gaseous halogen, optionally mixed with an inert gas.

To summarise, when the conditions of the process which constitute the object of the invention are employed, halogenated olefin polymers and copolymers are successfully prepared which are stabilised and have a uniform structure (the halogen atoms are uniformly distributed along the macromolecular chain). Moreover, their rigidity modulus determinated at 40° C. for a torsion angle of arc 110°, in accordance with ASTM Standard D 1043–51 is characteristic of a pliancy condition which classifies these products intermediate between the soft and sticky rubbery products and the rigid and brittle products as prepared by the previous halogenation methods.

The halogenated olefin polymers and copolymers prepared in accordance with the process which constitutes the object of the invention are suitable for quite a large number of applications, thanks to their combination of excellent properties.

Thus, the threads, fibres, filaments, and tapes prepared from these products can undergo permanent deformation under a certain stretching and, in this state, acquire exceptional resistance to stressing. This remarkable property can be exploited for the production of threads, fibres, and tapes of all types.

Moreover, it has been observed that films from halogenated olefin polymers or copolymers according to the process which constitutes the object of the invention can, after stretching, undergo an appreciable shrinkage by immersion in hot water.

They can be employed with advantage in the field of packaging for objects of all types, and particularly for foodstuffs.

In addition, when mixed with a filler material of which asbestos is a typical example, and with various other ingredients such as lubricants, pigments, etc., the halogenated olefin polymers and copolymers to which the present invention refers, give compositions which are suitable for the production of sheets or tiles destined as floor coverings. The pliancy of such halogenated olefin polymers and copolymers is such that it is not necessary to incorporate a plasticiser in the above compositions as is the case when the polymers employed are, for example, polyvinyl chloride, polyvinyl acetate, and coumarone resins.

The halogenated olefin polymers and copolymers according to the process of the invention, for example chlorinated polyethylenes, are also capable of being employed to improve the shock resistance of compositions based on homopolymers or copolymers frm vinyl, chloride, styrene, vinyl acetals, etc. The amounts of chlorinated polymers or copolymers to be incorporated in such compositions varies in accordance with the required degree of shock resistance, and may be, for instance, from 5 to 50%, by weight, on the total matter.

The examples given hereafter illustrate the process of the invention without thereby limiting its scope. Examples 1 to 3 are given by way of comparative evidence in order to emphasize the technical progress achieved by the process which constitutes the object of the invention.

In all the examples described, the procedure is as follows:

The solid olefin polymer or copolymer, in a finely divided state, is introduced into a 3 litre rotary drum of Pyrex, having diameter 15 cm., revolving about a horizontal axis at a rate of 60 revolutions/minute, and partially immersed in an oil bath employed for heating. The reaction vessel is heated at a temperature several degrees below the temperature selected for halogenation, the drum is swept out with nitrogen, and halogen is then introduced at the desired rate. The temperature adjusts itself to the desired value owing to the exothermal nature of the reaction. Unless otherwise indicated, the reaction medium is illuminated by means of a 450W Philora bulb.

When the reaction is effected in a single stage (Examples 1, 2 and 21), the reaction vessel is cooled after the desired duration of the reaction, the halogen which has not reacted is removed with nitrogen, the halogenated polymer or copolymer is withdrawn, and this is washed with methanol and dried in vacuo in an oven.

When the reaction takes place in two stages without assistance from the antistatic agent (Example 3), the reaction vessel is not evacuated after the primary stage but is merely purged with nitrogen, the temperature is increased under the current of nitrogen which is replaced by halogen when the operating temperature selected for the secondary halogenation stage has been almost attained. This secondary stage is then carried out like the first one, and it is terminated in a like manner.

When the reaction takes place in two stages with assistance from an antistatic agent (Examples 4–20), the reaction vessel is evacuated after the primary stage, and the partially halogenated olefin polymer or copolymer is moistened with a solution of the antistatic agent in isopropyl alcohol which had previously been diluted by means of methanol. The mixture is stirred until homogeneous, it is dried, heated to 50° C. in vacuo to constant weight, and the product is then again introduced into the reaction vessel. The secondary halogenation stage is then carried out like the first one, and it is terminated in a like manner.

At any time during the reaction, fixation of the halogen is determined by analysis of the gases leaving the reaction vessel.

*Example 1*

A polyethylene of viscosimetric molecular weight 47,200, as obtained by polymerization of ethylene in presence of a chromium oxide catalyst, is the starting material. The temperatures at the onset and at the end of the endothermal fusion phenomenon characteristic for this polymer are 117 and 134° C., respectively. This polymer is subdivided into very fine particles by dissolution in carbon tetrachloride at 110° C. and slow reprecipitation. 210 g. of the fine powder thus obtained are subjected at 90° C. for 3 hours to the action of chlorine, employed at the rate of 7 g. mol/kg. of polyethylene per hour.

348 g. of a white chlorinated polyethylene are obtained, analysing at 40.8%, by weight of chlorine, and possessing a rigidity modulus of 1340 kg./cm.$^2$, i.e. it is very hard, but brittle.

*Example 2*

210 g. of the same polyethylene as in Example 1 are subjected at 125° C. for 7 hours to the action of chlorine introduced at the rate of 7 g. mol/kg. of polyethylene per hour.

There are obtained 460 g. of a polyethylene analysing at 56% by weight of chlorine.

The product is softer than the one from Example 1; it exhibits a rigidity modulus of 350 kg./cm.$^2$ but it is brown and therefore degraded.

*Example 3*

210 g. of the same polyethylene as in Example 1 are subjected in a primary stage at 90° C. for 1 hour to the action of chlorine at the rate of 3.5 g. mol/kg. of polyethylene per hour. The partially chlorinated product obtained at this stage is white and analyses at 9% by weight of chlorine.

In a secondary stage, chlorination is continued at 120–125° C. for 3 hours, chlorine being employed at the rate of 7 g. mol/kg. of initial polymer per hour.

Eventually, there are obtained 358 g. of a deep yellow chlorinated polyethylene, analysing at 42.7% by weight of chlorine and possessing a rigidity modulus of 260 kg./cm.$^2$.

*Example 4*

100 g. of the polyethylene referred to in Examples 1, 2, and 3 are subjected in a primary stage at 90° C. for 0.67 hour to the action of chlorine at the rate of 3.5 g. mol of chlorine/kg. of polymer per hour.

The partially chlorinated product, analysing at 7% by weight of chlorine, is mixed with 2%, by weight referred to the initial polyethylene, of triethanolamine-lauryl sulphate, and is then chlorinated in a secondary stage at 135° C. for 2 hours, chlorine being employed at a rate of 6 g. mol/kg. of initial polyethylene per hour.

141 g. of a white product are obtained, analysing at 30% by weight of chlorine and having a rigidity modulus of 10 kg./cm.$^2$. This chlorinated polyethylene is stable, pliant, and not sticky. It does not require vulcanisation in order to be utilised.

*Example 5*

The starting material is an ethylene-butene copolymer containing 3–4% of butene, of viscosimetric molecular weight of 52,570, and having been obtained by copolymerisation in presence of a chromium oxide catalyst. Before being subjected to chlorination, this copolymer is subdivided into very fine particles by dissolution in carbon tetrachloride at 110° C. and slow reprecipitation. The temperature at the onset and at the end of endothermal fusion phenomenon characteristic for this copolymer are 120 and 131° C., respectively.

100 g. of this copolymer are treated in a primary stage at 90° C. for 0.75 hour with chlorine employed at the rate of 3.5 g. mol/kg. of copolymer per hour. At this stage, the product is white and analyses at 8% by weight of chlorine.

After addition of 2%, by weight referred to the starting copolymer, of triethanolamine-lauryl sulphate, the partially chlorinated copolymer is then treated with chlorine in a secondary stage at 132° C. for 1.65 hours, chlorine being introduced at the rate of 6 g. mol/kg. of initial copolymer per hour.

There are obtained 142 kg. of a copolymer analysing at 30% by weight of chlorine. The product is white and possesses a rigidity modulus of 16 kg./cm.$^2$.

*Example 6*

100 g. of the same copolymer as in Example 5 are subjected in a primary stage at 90° C. for 0.75 hour to the action of chlorine introduced at the rate of 3.5 g. mol/kg. of copolymer per hour.

2%, by weight calculated by reference to the initial copolymer, of dodecyl-trimethyl-ammonium chloride are added to the partially chlorinated copolymer, which analyses at 8.3% by weight of chlorine, and chlorination is then continued at 130° C. for 1.5 hours, chlorine being introduced at the rate of 6 g. mol/kg. of copolymer per hour.

There are obtained 134 g. of a white chlorinated copolymer analysing at 25.1% by weight of chlorine and possessing a rigidity modulus of 36 kg./cm.$^2$.

*Example 7*

100 g. of the same copolymer as in Example 5 are chlorinated for 0.75 hour in a primary stage at 90° C., chlorine being added at the rate of 3.5 g. mol/kg. of copolymer per hour.

The partially chlorinated copolymer is mixed with 2%, by weight referred to the initial copolymer, of octadecyl-trimethyl-ammonium chloride, and chlorination is continued at 132° C. for 1.65 hours, chlorine being passed at the rate of 6 g. mol/kg. of initial copolymer per hour.

Eventually, there are obtained 138 g. of a white product analysing at 28.3% by weight of chlorine and possessing a rigidity modulus of 20 kg./cm.$^2$.

*Example 8*

100 g. of the same copolymer as in Example 5 are chlorinated in the first instance at 90° C. for 0.75 hour, chlorine being introduced at the rate of 3.5 g. mol/kg. of copolymer per hour.

The copolymer obtained at this stage, analysing at 7.6% by weight of chlorine, is mixed with 2%, by weight referred to the initial copolymer, of stearamidopropyl-dimethyl-$\beta$-hydroxyethyl-ammonium dihydrogen phosphate, and chlorination is continued at 130° C. for 1.65 hours, chlorine being passed at the rate of 6 g. mol/kg. of initial copolymer per hour.

There are obtained 139 g. of a white copolymer analysing at 29% by weight of chlorine and having a rigidity modulus of 29 kg./cm.$^2$.

*Example 9*

100 g. of the same copolymer as that employed in Examples 5, 6, 7 and 8 are treated in a primary stage at 90° C. for 0.83 hour with chlorine introduced at a rate of 3.5 g. mol/kg. of copolymer per hour.

The chlorinated product obtained at this stage analyses at 7.5% by weight of chlorine. 2% by weight, referred to the initial copolymer, of dimethyl-benzyl-lauryl-ammonium chloride are incorporated with it, and chlorination is continued at 135° C. for 1.66 hours, chlorine being introduced at the rate of 6 g. mol/kg. of initial copolymer per hour.

Eventually, there is obtained 142 g. of a yellowish-white copolymer analysing at 30.4% by weight of chlorine and having a rigidity modulus of 8 kg./cm.$^2$.

*Example 10*

The starting material is an ethylene-butene copolymer containing 3–4% of butene, of viscosimetric molecular weight 28,120, which was prepared by copolymerisation in presence of a chromium oxide catalyst. Before being subjected to chlorination, this copolymer is subdivided into very fine particles by dissolution in carbon tetrachloride at 110° C. and slow reprecipitation. The temperatures at the onset and at the end of the endothermal fusion phenomenon characteristic for this copolymer are 118 and 130° C., respectively.

100 g. of this copolymer are subjected in a primary stage at 90° C. for 0.75 hour to the action of chlorine which is introduced at the rate of 3.5 g. mol/kg. of copolymer per hour.

The product obtained at this stage analyses at 8.1% by weight of chlorine; 2%, by weight referred to the initial copolymer, of triethanolamine-lauryl sulphate are added to it. It is then chlorinated at 135° C. for 2 hours; chlorine is introduced at the rate of 6 g. mol/kg. of initial copolymer per hour.

There are obtained 147 g. of a white product analysing at 32.9% by weight of chlorine and possessing a rigidity modulus of 10 kg./cm.$^2$.

*Example 11*

Use is made of a polyethylene of viscosimetric molecular weight 145,000 obtained by polymerisation in presence of a chromium oxide catalyst. This polymer appears in the form of very porous granules which do not require subdivision. The temperature at the onset and at the end of the endothermal fusion phenomenon characteristic for this polymer are 126 and 139° C., respectively.

Partial chlorination is effected on 150 g. of this polymer at 90° C. for 0.83 hour by the action of chlorine introduced at the rate of 3.5 g. mol/kg. of polymer per hour. The chlorinated polymer obtained analyses at 9.3% by weight of chlorine. 2%, by weight referred to the initial polymer, of triethanolamine-lauryl sulphate are added to it. Chlorination is then continued at 135° C. for 1.83 hours by the action of chlorine at the rate of 6.3 g. mol/kg. of starting polymer per hour.

There is obtained 224 g. of a chlorinated white polyethylene analysing at 34% by weight of chlorine and having a rigidity modulus of 23 kg./cm.$^2$.

*Example 12*

150 g. of the same polymer as that in Example 11 are submitted to partial chlorination at 90° C. for 0.83 hour with chlorine introduced at the rate of 3.9 g. mol/kg. of polymer per hour.

The partially chlorinated polyethylene analysing at 10.2% by weight of chlorine is mixed with 2% by weight, referred to the initial polyethylene, of dimethyl-benzyl-lauryl-ammonium chloride, and is submitted to supplementary chlorination at 135° C. for 1.83 hours, with chlorine introduced at the rate of 6 g. mol/kg. of initial polyethylene per hour.

There is obtained 216 g. of a white product analysing at 31.5% by weight of chlorine and having a rigidity modulus of 16 kg./cm.$^2$.

*Example 13*

150 g. of the same polymer as that in Examples 11 and 12 are partially chlorinated, in darkness, at 92° C. for 1 hour by the action of chlorine introduced at the rate of 3.4 g. mol/kg. of polymer per hour.

The partially chlorinated polymer analyses at 9.2% by weight of chlorine and is mixed with 2% by weight, referred to the initial polymer, of triethanolamine-lauryl sulphate. The mixture is subjected, in darkness at 135° C. for 1.85 hours, to the action of chlorine introduced at the rate of 6.4 g. mol/kg. of initial polymer per hour.

There is obtained 219 g. of a chlorinated white polyethylene analysing at 32.4% by weight of chlorine and having a rigidity modulus of 10 kg./cm.$^2$.

*Example 14*

Use is made of an ethylene-butene copolymer containing 2.5% of butene of specific gravity 0.95 and obtained by copolymerisation in presence of a chromium oxide catalyst. This copolymer appears in the form of very porous irregular particles. The temperatures at the onset and at the end of the endothermal fusion phenomenon characteristic for this copolymer are 120 and 136° C., respectively.

150 g. of this polymer are first chlorinated at 90° C. for 0.83 hour by the action of chlorine at the rate of 3.5 g. mol/kg. of copolymer per hour.

The partially chlorinated product analysing at 9.4% by weight of chlorine is mixed with 2%, by weight referred to the initial copolymer, of triethanolamine-lauryl sulphate. The mixture is then chlorinated at 135° C. for 1.83 hours by means of chlorine introduced at the rate of 6 g. mol/kg. of starting copolymer per hour.

There is obtained 216 g. of a white product containing 31.5% by weight of chlorine, and whose rigidity modulus is 18 kg./cm.$^2$.

*Example 15*

A copolymer analogous to that employed in Example 14 is the starting material. This copolymer contains 3.5% of butene and possesses a specific gravity of 0.94. The temperatures at the onset and at the end of the endothermal fusion phenomenon are 117 and 132° C., respectively.

150 g. of this copolymer are chlorinated at 90° C. for 0.83 hour by the action of chlorine at the rate of 3.4 g. mol/kg. of copolymer per hour.

There is obtained a partially chlorinated product analysing at 8.7% by weight of chlorine. 2%, by weight referred to the initial copolymer, of triethanolamine-lauryl sulphate are added to it. The mixture is chlorinated at 135° C. for 1.83 hours by means of chlorine which is introduced at the rate of 6 g. mol/kg. of initial copolymer per hour.

213 g. of a white chlorinated product are obtained, analysing at 30.5% by weight of chlorine. The rigidity modulus is 16 kg./cm.$^2$.

*Example 16*

Use is made of a polyethylene with viscosimetric molecular weight 52,000 obtained by polymerization in presence of an organometallic catalyst $TiCl_4$—$AlCl_3$—$Sn(C_4H_9)_4$. This polymer appears in the form of porous particles. The temperatures at the onset and at the end of the endothermal fusion phenomenon characteristic for this polyethylene are 119 and 131° C., respectively.

70 g. of this polyethylene are chlorinated in a primary stage at 90° C. for 0.75 hour by the action of chlorine introduced at the rate of 4 g. mol/kg. of polymer per hour.

The partially chlorinated polyethylene contains 8.9% by weight of chlorine. 2%, by weight referred to the starting polymer, of triethanolamine-lauryl sulphate are added to it, and chlorination is continued at 127° C. for 1.67 hours, chlorine being introduced at the rate of 6 g. mol/kg. of initial polyethylene per hour.

There is obtained 99.5 g. of a white chlorinated polyethylene containing 30.9% by weight of chlorine and possessing a rigidity modulus of 7 kg./cm.$^2$.

Example 17

A polymer analogous to that employed in Example 16 is the starting material. Its viscosimetric molecular weight amounts to 84,000 and its temperature at the onset and at the end of the endothermal fusion phenomenon are 120 and 131° C.

150 g. are subjected to chlorination for 0.83 hour at 90° C. Chlorine is introduced at the rate of 3.4 g. mol/kg. of polymer per hour.

The partially chlorinated polymer as obtained contains 8.7% by weight of chlorine. 2%, by weight referred to the initial polyethylene, of triethanolamine-lauryl sulphate are added to it, and it is then chlorinated at 138° C. for 1.83 hours, chlorine being employed at the rate of 6 g. mol/kg. of initial polymer per hour.

There is obtained 217 g. of a white chlorinated polyethylene analysing at 31.7% by weight of chlorine and possessing a rigidity modulus of 13 kg./cm.$^2$.

Example 18

A polyethylene of viscosimetric molecular weight 160,000, obtained like the polyethylene of Examples 16 and 17, is the starting material. The temperatures at the onset and at the end of the endothermic fusion phenomenon amount to 120 and 134° C. respectively.

100 g. of this polymer are treated at 90° C. for 2.5 hours in the dark with chlorine introduced at the rate of 3.5 g. mol/kg. of polymer per hour.

The partially chlorinated polyethylene as obtained contains 9.6% by weight of chlorine. 1.5% by weight, referred to the starting polyethylene, of dimethyl-benzyl-lauryl-ammonium chloride are added to it. The mixture is chlorinated, in darkness throughout, at 135° C. for 2.5 hours by means of chlorine introduced at the rate of 6.1 g. mol/kg. of initial polyethylene per hour.

There is obtained 150 g. of a white chlorinated polymer containing 34.4% of chlorine and possessing a rigidity modulus of 6 kg./cm.$^2$.

Example 19

A polyethylene of viscosimetric molecular weight 380,000 analogous to those polyethylenes employed in Examples 16, 17 and 18 is the starting material. The temperatures at the onset and at the end of the endothermal fusion phenomenon are 124 and 138° C., respectively.

100 g. of this polymer are chlorinated at 90° C. for 0.83 hour by means of chlorine introduced at the rate of 3.4 g. mol/kg. of polymer per hour.

The partially chlorinated polyethylene as obtained analyses at 8.5% by weight of chlorine. 2%, by weight referred to the initial polyethylene, of triethanolamine-lauryl sulphate is added to it, and chlorination is continued for 1.83 hours at 135° C. by means of chlorine introduced at the rate of 6 g. mol/kg. of starting polymer per hour.

There is obtained 146 g. of a white chlorinated polyethylene containing 32.4% by weight of chlorine and having a rigidity modulus of 10 kg./cm.$^2$.

Example 20

An ethylene-propylene copolymer containing 3–4% by weight of propylene and obtained by copolymerisation in presence of a chromium oxide catalyst is the starting material. This copolymer appears in the form of very porous irregular grains which it is not necessary to subdivide. The temperatures at the onset and at the end of the endothermal fusion phenomenon characteristic for this copolymer are 110 and 135° C., respectively.

200 g. of this copolymer are treated at 50° C. for 45 minutes with chlorine employed at the rate of 5.2 g. mol/kg. of copolymer per hour.

The partially chlorinated product as obtained is white and analyses at 9% by weight of chlorine.

To this product, there is added 2%, by weight, of dimethyl-benzyl-lauryl-ammonium chloride, and chlorination is continued at 131° C. for 2 hours by means of chlorine introduced at the rate of 5 g. mol/kg. of initial copolymer.

The final product is white, analyses at 37.5% by weight of chlorine, and possesses a rigidity modulus of 8 kg./cm.$^2$.

Example 21

150 grams of the same polyethylene as that employed in Example 11 is the starting material.

2%, by weight, of dimethyl-benzyl-lauryl-ammonium chloride are added, and the chlorination of the mixture is carried out at 132° C. for 3 hours by means of chlorine added at the rate of 6.1 g. mol/kg. of polymer per hour. The reaction is carried out in darkness.

The chlorinated product does not stick at all to the walls of the reaction vessel. 244 g. of it are obtained. This product analyses at 39.5% by weight of chlorine and possesses a rigidity modulus of 7 kg./cm.$^2$.

We claim:

1. A two-stage process for the chlorination of a polymeric olefin selected from the group consisting of polymers and copolymers formed exclusively from acyclic alpha mono-olefins to produce a uniformly-chlorinated pliant and stable chlorinated polymeric olefin, which comprises treating said polymeric olefin in a first chlorination step by subjecting said polymeric olefin in a finely-divided state to the action of gaseous chlorine while in suspension in said gaseous chlorine, at a temperature below the temperature at which the crystallinity of the polymeric olefin begins to disappear, and subjecting the resultant partially-chlorinated polymeric olefin to a second chlorination step by treating the partially-chlorinated polymeric olefin in finely-divided form with gaseous chlorine while in suspension in said gaseous chlorine, in the presence of a quaternary ammonium salt selected from the group consisting of triethanolamine-lauryl sulphate, stearamidopropyl-dimethyl-B-hydroxyethyl-ammonium dihydrogen phosphate, dodecyl-trimethyl-ammonium chloride, octadecyl-trimethyl-ammonium chloride, and dimethyl-benzyl-lauryl-ammonium chloride at a temperature above the temperature at which the crystallinity of the polymeric olefin begins to disappear.

2. A two-stage process for the chlorination of a polymeric olefin selected from the group consisting of polymers and copolymers formed exclusively from acyclic alpha mono-olefins to produce a uniformly-chlorinated pliant and stable chlorinated polymeric olefin, which comprises treating said polymeric olefin in a first chlorination step by subjecting said polymeric olefin in a finely-divided state to the action of gaseous chlorine while in suspension in said gaseous chlorine, at a temperature below the temperature at which the crystallinity of the polymeric olefin begins to disappear, and subjecting the resultant partially-chlorinated polymeric olefin to a second chlorination step by treating the partially-chlorinated polymeric olefin in finely-divided form with gaseous chlorine diluted with an inert gas while in suspension in said diluted gaseous chlorine, in the presence of a quaternary ammonium salt selected from the group consisting of triethanolaminelauryl sulphate, stearamidopropyldimethyl-B-hydroxyethyl-ammonium dihydrogen phosphate, dodecyltrimethyl-ammonium chloride, octadecyl-trimethyl-ammonium chloride, and dimethyl-benzyl-lauryl-ammonium chloride, at a temperature above the temperature at which the crystallinity of the polymeric olefin begins to disappear.

3. A two-stage process for the chlorination of a polymeric olefin selected from the group consisting of polymers and copolymers formed exclusively from acyclic alpha mono-olefins to produce a uniformly-chlorinated pliant and stable chlorinated polymeric olefin, which comprises treating said polymeric olefin in a first chlorination step by subjecting said polymeric olefin in a finely-divided state to the action of gaseous chlorine while in suspension in said gaseous chlorine, at a temperature below the temperature at which the crystallinity of the polymeric olefin begins to disappear, and subjecting the resultant partially-chlorinated polymeric olefin to a second chlorination step by treating the partially-chlorinated polymeric olefin with gaseous chlorine while in suspension in said gaseous chlorine, in the presence of triethanolamine-lauryl sulphate at a temperature above the temperature at which the crystallinity of the polymeric olefin begins to disappear.

4. A two-stage process for the chlorination of a polymeric olefin selected from the group consisting of polymers and copolymers formed exclusively from acyclic alpha mono-olefins to produce a uniformly-chlorinated pliant and stable chlorinated polymeric olefin, which comprises treating said polymeric olefin in a first chlorination step by subjecting said polymeric olefin in a finely-divided state to the action of gaseous chlorine while in suspension in said gaseous chlorine, at a temperature below the temperature at which the crystallinity of the polymeric olefin begins to disappear, and subjecting the resultant partially-chlorinated polymeric olefin to a second chlorination step by treating the partially-chlorinated polymeric olefin with gaseous chlorine while in suspension in said gaseous chlorine, in the presence of 0.5 to 5% of a quaternary ammonium salt based on the weight of said polymeric olefin, said quaternary ammonium salt being selected from the group consisting of triethanolamine-lauryl sulphate, stearamidopropyl-dimethyl-B-hydroxyethyl-ammonium dihydrogen phosphate, dodecyl-trimethyl-ammonium chloride, octadecyl-trimethyl-ammonium chloride, and dimethyl-benzyl-lauryl-ammonium chloride at a temperature above the temperature at which the crystallinity of the polymeric olefin begins to disappear.

5. A two-stage process for the chlorination of polyethylenes to produce uniformly-chlorinated pliant and stable chlorinated polyethylenes which comprises treating a polyethylene in a first chlorination step by subjecting said polyethylene in a finely-divided state to the action of gaseous chlorine while in suspension in said gaseous chlorine, at a temperature below the temperature at which the crystallinity of the polyethylene begins to disappear, and subjecting the resultant partially-chlorinated polyethylene to a second chlorination step by treating the partially-chlorinated polyethylene with gaseous chlorine while in suspension in said gaseous chlorine, in the presence of a quaternary ammonium salt selected from the group consisting of triethanolamine-lauryl sulphate, stearamidopropyl-dimethyl - B - hydroxyethyl-ammonium dihydrogen phosphate, dodecyl - trimethyl - ammonium chloride, octadecyl-trimethyl-ammonium chloride, and dimethyl-benzyl-lauryl-ammonium chloride, at a temperature above the temperature at which the crystallinity of the polyethylene begins to disappear.

References Cited by the Examiner
UNITED STATES PATENTS

| | | | |
|---|---|---|---|
| 2,327,517 | 8/43 | Frolich et al. | 260—96 |
| 2,398,803 | 4/46 | Myles et al. | 260—94.9 |
| 2,879,244 | 3/59 | Coler | 260—32.6 |
| 2,891,027 | 6/59 | Coler et al. | 260—32.6 |
| 2,913,449 | 11/59 | Hoerger et al. | 260—94.9 |

JOSEPH L. SCHOFER, *Primary Examiner.*

LEON J. BERCOVITZ, WILLIAM H. SHORT,
*Examiners.*